(No Model.)

F. M. PRIESTLEY.
FIFTH WHEEL.

No. 265,140.  Patented Sept. 26, 1882.

Witnesses
Walter Donaldson
S. W. Luny

Inventor
Forrest M. Priestley
by Ellis Spear
Atty.

UNITED STATES PATENT OFFICE.

FORREST M. PRIESTLEY, OF GRAND RAPIDS, MICHIGAN.

FIFTH-WHEEL.

SPECIFICATION forming part of Letters Patent No. 265,140, dated September 26, 1882.

Application filed February 21, 1882. (No model.)

*To all whom it may concern:*

Be it known that I, FORREST M. PRIESTLEY, of Grand Rapids, in the county of Kent and State of Michigan, have invented a new and useful Improvement in Fifth-Wheels; and I do hereby declare that the following is a full, clear, and exact description of the same.

My invention relates to an improvement in fifth-wheels, intended more particularly for use on children's carriages and wagons, but adapted for use on all kinds of light vehicles.

My invention consists in the peculiar construction and manner of connecting the circular movable plate with the bed-plate attached to the axle, and, in general, in special improvements of details, all fully hereinafter described and claimed.

Figure 1:
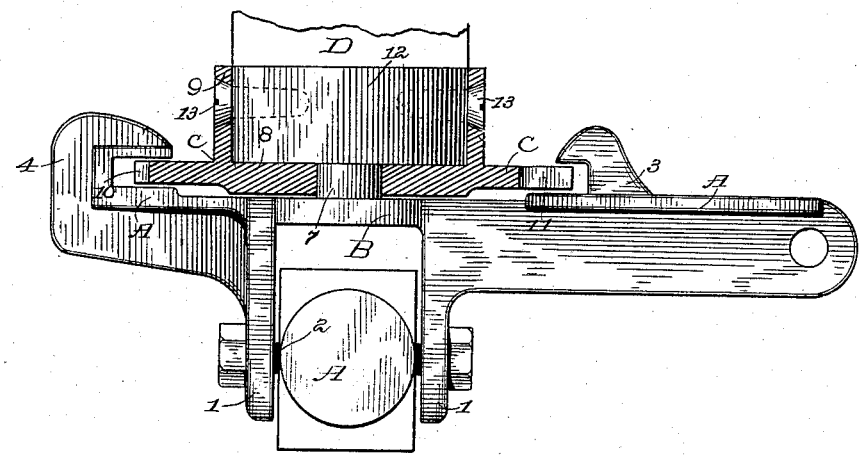
Figure 2:
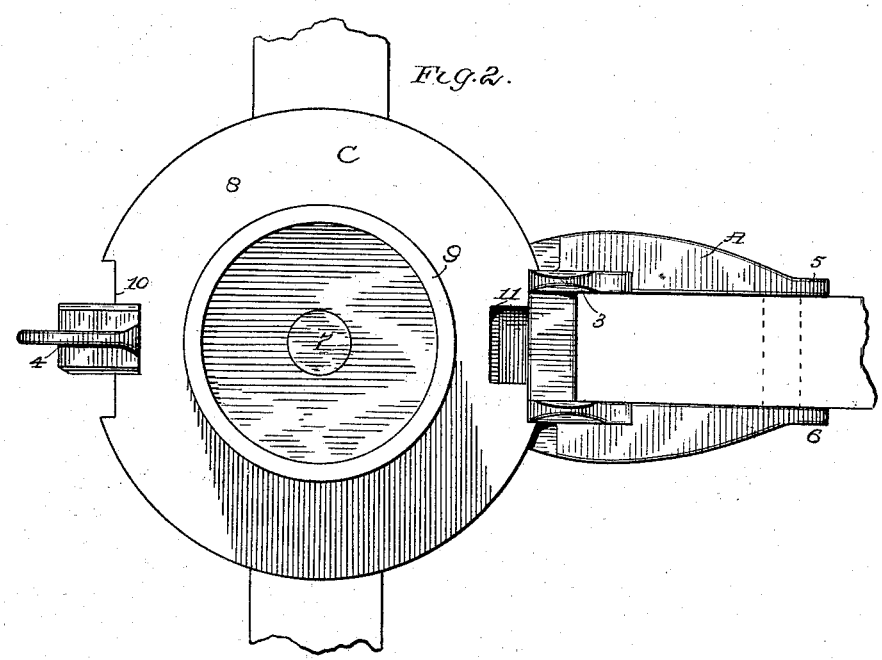

In the drawings, Figure 1 shows a section of the upper and a side elevation of the lower plate. Fig. 2 is a top view.

In these drawings, A represents the front axle of a vehicle. B is the cast bottom plate, provided with integral flanges, 1 1, one on each side of the axle, by which the bottom plate may be riveted to such axle, as shown at 2, to permit a lateral swinging movement of the axle and plate independently of each other. The plate A' is also provided with hooked standards 3 4, placed opposite one another at the front and rear, respectively, and with ears 5 6, between which the tongue is pivoted, as shown. The bottom plate is also provided with a central pin or stud, 7. The rotary top plate is represented in the drawings at C. It consists of a circular plate, 8, having a vertical flange, 9, which is made preferably of circular shape, and is so shown; but it may be of polygonal shape, if preferred. The plate 8 is bored out centrally to admit the pin 7 on the bottom plate and to turn easily thereon, and when in position the edge of the movable plate will turn freely, held by the standards 3 4. In the edge of the plate C and on opposite sides are recesses 10 11, corresponding in shape and size respectively to the standards 3 and 4. When the fifth-wheel is in its ordinary or normal position the recess 11 will be just beneath the standard 3 and the recess 10 opposite and beneath the standard 4, as shown in Fig. 2, in which position it is impossible to disconnect the two plates.

The bolster D is provided with a standard, 12, which is driven into the space formed by the flange 9 and secured therein by screws 13. The bolster may be of any shape, provided it has the lower standard to fit the top plate of the fifth-wheel.

The hinging of the bottom plate to the axle permits either wheel to ride over obstructions and to raise the front axle independently of the remaining running-gear, avoiding any strain on the boxes and rear axle.

It will be understood that the parts can be easily disconnected by turning the fifth-wheel entirely around, so that the recess 10 will register with the standard 3.

This construction is particularly adapted for light wagons and carriages, and also for children's carriages. Any shape of spring may be used. The plates, being cast in one piece, are cheap to make and have the advantage of requiring no bolts or other fastening devices.

Having thus described my invention, I claim—

1. A fifth-wheel composed of a bed-plate, A, having hooked standards 3 4, and a top plate, B, having recesses 10 and 11 and a central flange, 9.

2. The combination, with the bed-plate pivoted or hinged to the axle and having the standards 3 4 and pin 7, of the recessed top plate, B, having a central opening and a flange, 9.

3. The bottom plate having lugs 5 6, flanges 1 1, and standards 3 4, all cast in one piece, with the top plate having the recesses and vertical flange adapted to be secured removably to the bottom plate without independent fastening devices.

In testimony whereof I have signed my name to this specification in the presence of two subscribing witnesses.

FORREST M. PRIESTLEY.

Witnesses:
 McGEORGE BUNDY,
 E. E. WINSOR.